US005692931A

United States Patent [19]

Kawai

[11] Patent Number: 5,692,931

[45] Date of Patent: Dec. 2, 1997

[54] CONTROL ARRANGEMENT FOR OUTBOARD MOTOR

[75] Inventor: Takaji Kawai, Hamamatsu, Japan

[73] Assignee: Sanshin Kogyo Kabushiki Kaisha, Hamamatsu, Japan

[21] Appl. No.: 675,579

[22] Filed: Jul. 3, 1996

[30] Foreign Application Priority Data

Jul. 5, 1995 [JP] Japan .................................... 7-170031

[51] Int. Cl.$^6$ .................................................. B60K 41/00

[52] U.S. Cl. ................................................................ 440/86

[58] Field of Search .............................. 74/480 B, 473 P; 440/1, 75, 84, 85, 86, 87

[56] References Cited

U.S. PATENT DOCUMENTS 4,527,441 7/1985 Nakahama .
4,753,618 6/1988 Entringer .................................. 440/86
4,963,109 10/1990 Hayasaka .
5,050,461 9/1991 Onoue et al. .
5,076,113 12/1991 Hayasaka .
5,261,844 11/1993 Shibata ........................................ 440/86
5,474,480 12/1995 Schwarz et al. .......................... 440/86

*Primary Examiner*—Stephen Avila
*Attorney, Agent, or Firm*—Knobbe, Martens, Olson & Bear, LLP

[57] ABSTRACT

An engine of an outboard motor includes an improved engine component layout to minimize the size of the engine and to generally isolate a shift position mechanism from an intake air flow into the engine. The outboard motor includes a shift actuation mechanism that shifts a transmission between three operational states: forward, neutral, and reverse. The shift actuation mechanism includes a shift position mechanism that defines the position of the shift actuation mechanism during each of these three operational states. The shift position mechanism is positioned beneath the engine crankcase and is formed in part by a shift lever of the actuation mechanism. This position and construction simplifies the design of the shift position mechanism and generally isolates the mechanism from any salt water or other contaminates the are entrained in the air flow stream within the cowling.

28 Claims, 15 Drawing Sheets

CONTROL ARRANGEMENT FOR OUTBOARD MOTOR

BACKGROUND OF THE INVENTION

1. Field of the Invention

The present invention relates to a marine engine for an outboard motor, and more particularly to a shift and throttle control arrangement for a marine engine.

2. Description of Related Art

Outboard motors recently have become equipped with four-cycle engines. The use of four-cycle engine in the power head of the outboard motor, however, raises some formidable challenges in regard to the engine layout and arrangement within the protective engine cowling.

For instance, in prior engine designs, the four-cycle engine commonly includes a large crankcase, as compared with two-cycle engines. A larger engine also results because a four-cycle engine requires an oil pan. As a result, prior engine designs have struggles to provide sufficient space within the cowling in which to position many of the outboard motor components, including a shift actuation mechanism.

In prior four-cycle engine layouts, the shift actuation mechanism commonly lies to the side of the engine, near an air intake into an induction system of the engine. The shift actuation mechanism commonly includes a shift position mechanism which defines the position of the shift actuation mechanism during each operational state of the transmission (e.g., forward, neutral, reverse). The shift position mechanism often lies below the air intake on the side of the engine.

This location of the shift position mechanism exposes the mechanism to salt water and other contaminates carried into the cowling by the intake air stream. The salt water tends to encrust on and rust the shift position mechanism. Malfunction of the mechanism consequently may result.

The prior layout of the shift position mechanism on the side of the engine also has resulted in an overly complicated mechanism. The increased number of parts and the complexity of the assembly may lead to assembly errors and to an increased possibility of malfunction.

In addition, the location of the shift actuation mechanism on the side of the engine tends to increase the size of the power head of the outboard motor. The power head generally extends above the transom of the watercraft and, as a result, the power head produces aerodynamic drag on the watercraft as the watercraft speeds over the water. The size and shape of the power head directly affect the amount of drag produced. The larger sized power head, which results from the prior layout of the shift actuation mechanism, thus negatively increases the drag experienced by the associated watercraft.

SUMMARY OF THE INVENTION

A need therefore exists for a simply-structured shift control mechanism which is arranged within the engine compartment of the power head in a compact manner and to remove the shift position mechanism from the air flow stream into the engine.

One aspect of the present invention thus involves an outboard drive comprising an engine. The engine drives a propulsion device through a transmission which is intended to operate under at least two operational conditions. The engine includes a crankshaft which rotates within a crankcase about a vertical-extending axis. A transmission control of the outboard drive comprises a shift actuation mechanism that operates the transmission. A shift lever of the shift actuation mechanism is attached to a shift control rod which is coupled to a clutch of the transmission. A shift position mechanism establishes the position of the shift lever corresponding with each operating condition of the transmission. The shift position mechanism is located directly beneath the crankcase of the engine to generally isolate the shift position mechanism from any salt water carried by the air flow stream into the engine.

BRIEF DESCRIPTION OF THE DRAWINGS

These and other features of the invention will now be described with reference to the drawings of a preferred embodiment which is intended to illustrate and not to limit the invention, and in which.

DETAILED DESCRIPTION OF THE PREFERRED EMBODIMENT

Figure 1:
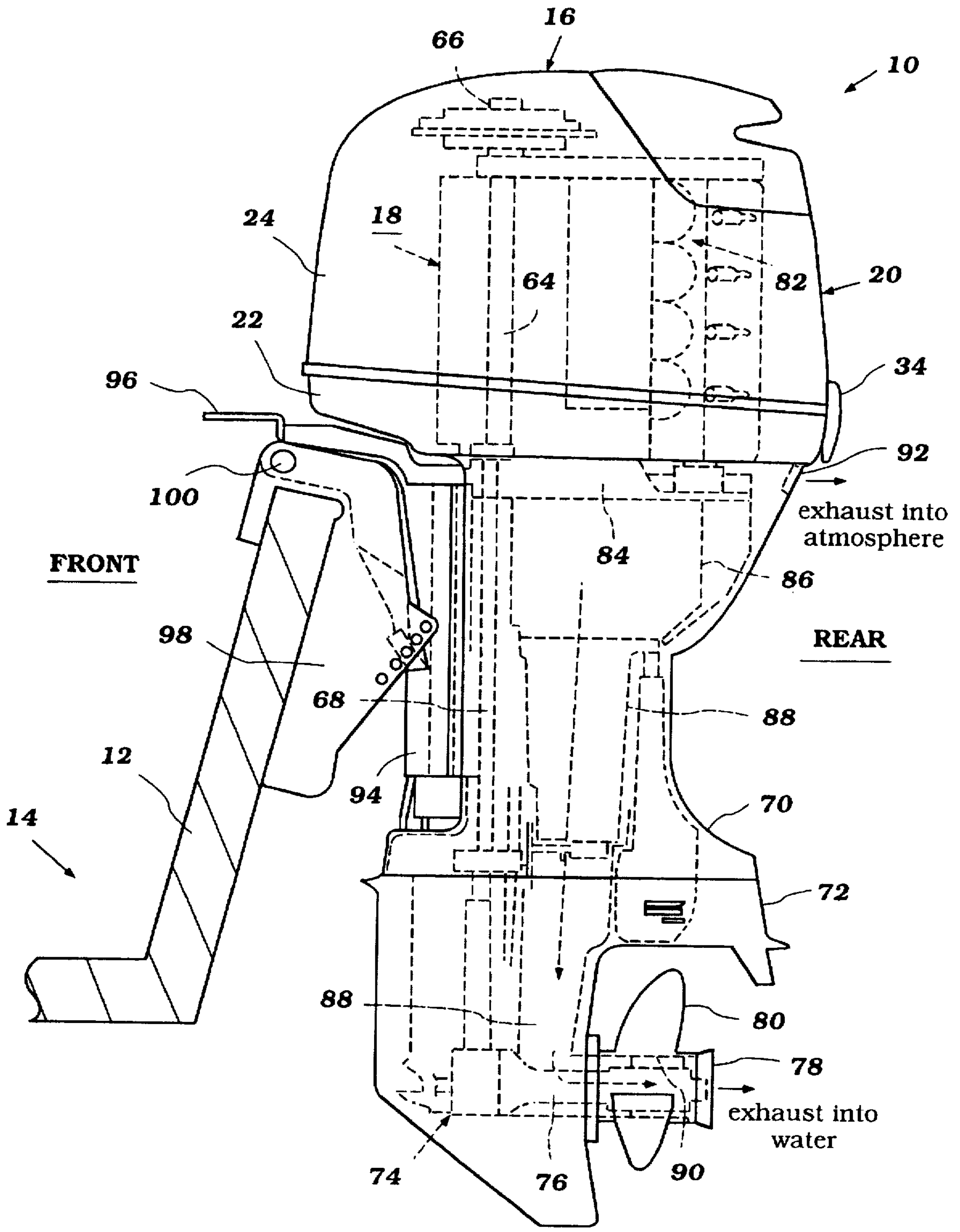
FIG. 1 is a starboard side elevational view of an outboard motor which incorporates a shift and throttle control arrangement configured in accordance with a preferred embodiment of the present invention.

FIG. 1 illustrates a marine outboard drive 10 which incorporates a shift and throttle control arrangement configured in accordance with the preferred embodiment of the present invention. In the illustrated embodiment, the outboard drive 10 is depicted as an outboard motor for mounting on a transom 12 at the stern of a watercraft 14. It is contemplated, however, the present control arrangement can be incorporated with other types of marine drives as well.

In order to facilitate the description of the present shift and control arrangement within the engine, the terms "front" and "rear" are used to indicated positions of the outboard motor components relative to a fixed datum: the transom of the watercraft. Thus, as used herein, "front" refers to a position or side closer to the watercraft transom 12, and "rear" refers to a position or side distanced from the transom 12. Some of the figures include labels to further aid the reader's understanding.

With initial reference to FIGS. 1 through 5, the outboard motor 12 has a power head 16 which includes an internal combustion engine 18. Because the present control arrangement has particular utility with a four-cycle engine, the present control arrangement will be described in connection with such an engine; however, the depiction of the engine in conjunction with a four-cycle, in-line, four-cylinder combustion engine is merely exemplary. Those skilled in the art will readily appreciate that the invention may be employed with engines having other numbers of cylinders, having other numbers of cylinder arrangements or orientations (e.g., V-type or slant), and/or operating on other than a four-stroke principle (e.g., on a two-cycle principle).

A protective cowling assembly 20 surrounds the engine. The cowling assembly 20 includes a lower tray 22 and a top cowling 24. The tray 22 and cowling 24 together define a compartment which houses the engine 18 with the lower tray 22 encircles a lower portion of the engine 18.

Figure 3:
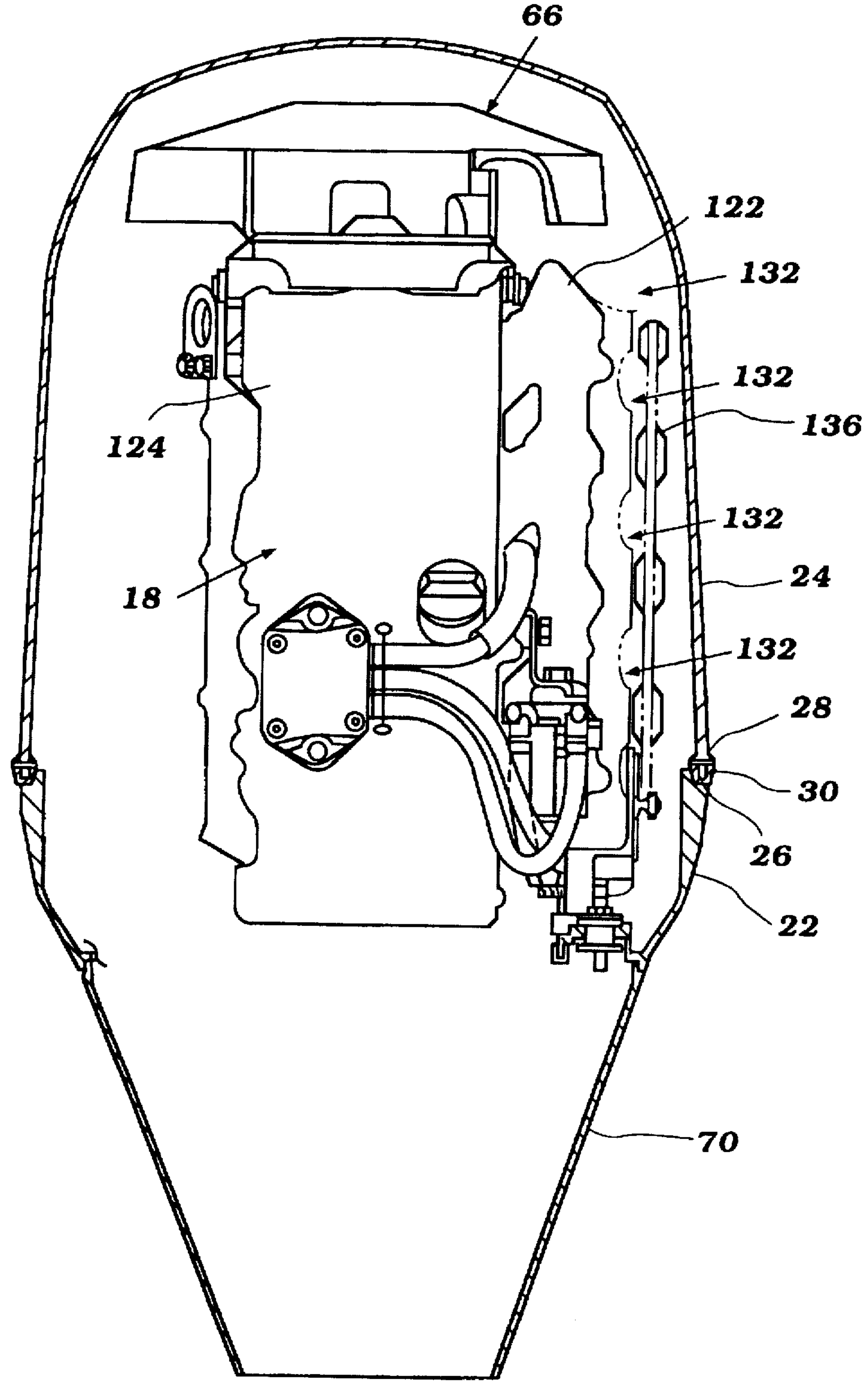
FIG. 3 is a rear elevational view of the engine of FIG. 2 with the cowling assembly and a portion of a drive shaft housing shown in cross-section.
Figure 4:
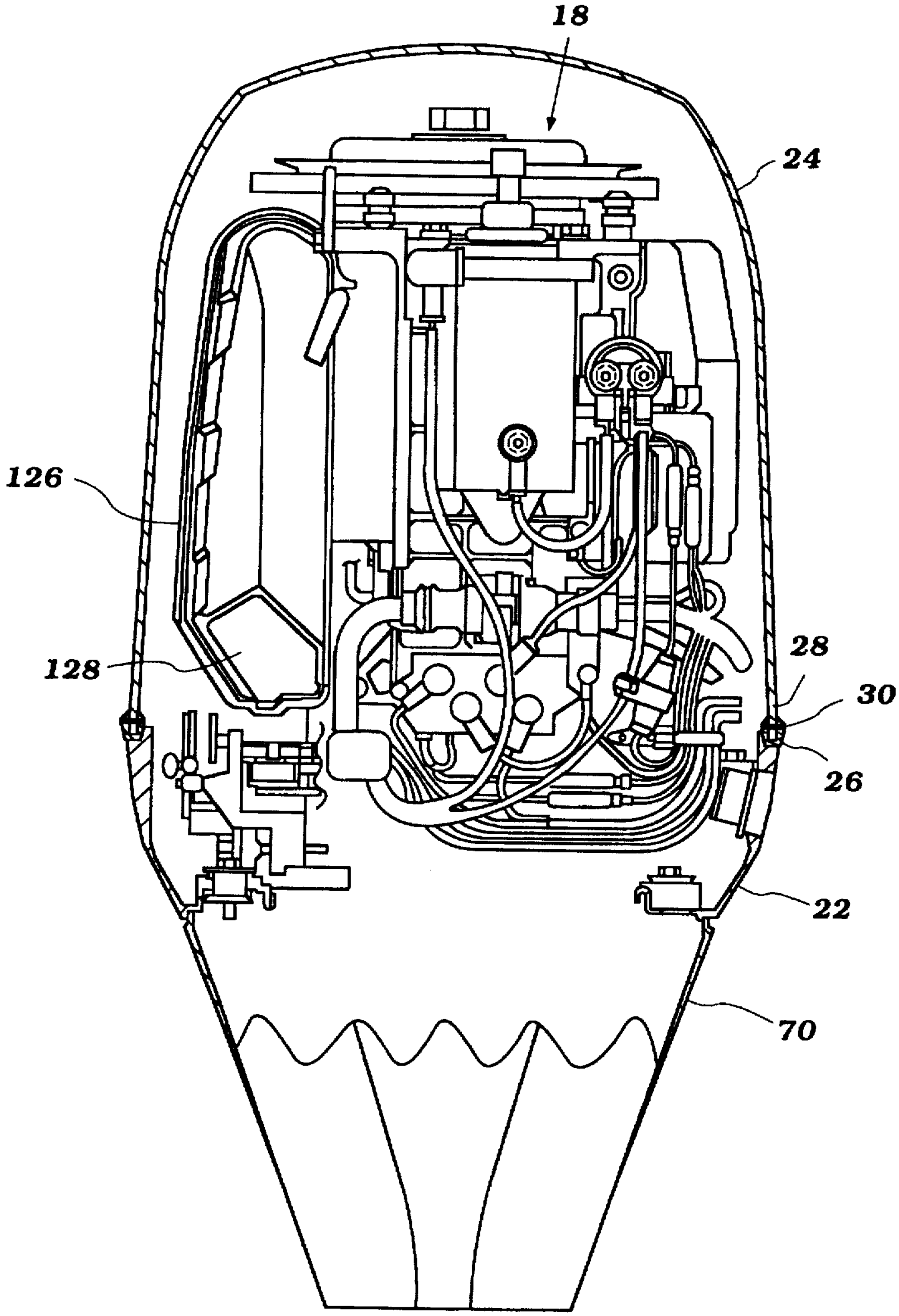
FIG. 4 is a front elevational view of the engine of FIG. 2 with the cowling assembly and a portion of the drive shaft housing shown in cross-section.

As best seen in FIGS. 3 and 4, the lower tray 22 defines a groove 26 around its periphery into which a lower edge 28 of the top cowling 24 inserts. A seal gasket 30 seals the junction between the lower tray 22 and the cowling 24 to inhibit water flow into the engine compartment.

A standard hinge 32 and toggle latch 34 secure the top cowling 24 to the tray 22. On the front side of the top cowling 24, the top cowling 24 includes a hook 36 which captures a corresponding portion of the tray 22. Rivets 38 or like fasteners secure the hook 36 to an inner surface of the cowling 24 which a U-shaped portion projecting below the lower edge 28 of the cowling 24. The U-shaped portion fits around a generally square lug formed at an upper end 26 of the lower tray 22. The lower tray 22 also includes a recess 40 beneath the lug which receives a portion of the hook 36. The recess 40 has a sufficient size allow the hook 36 to rotate about the lug, as well as to allow the hook 36 to be slid off the lug to disengage the upper cowling 24 from the lower tray 22.

Figure 2:
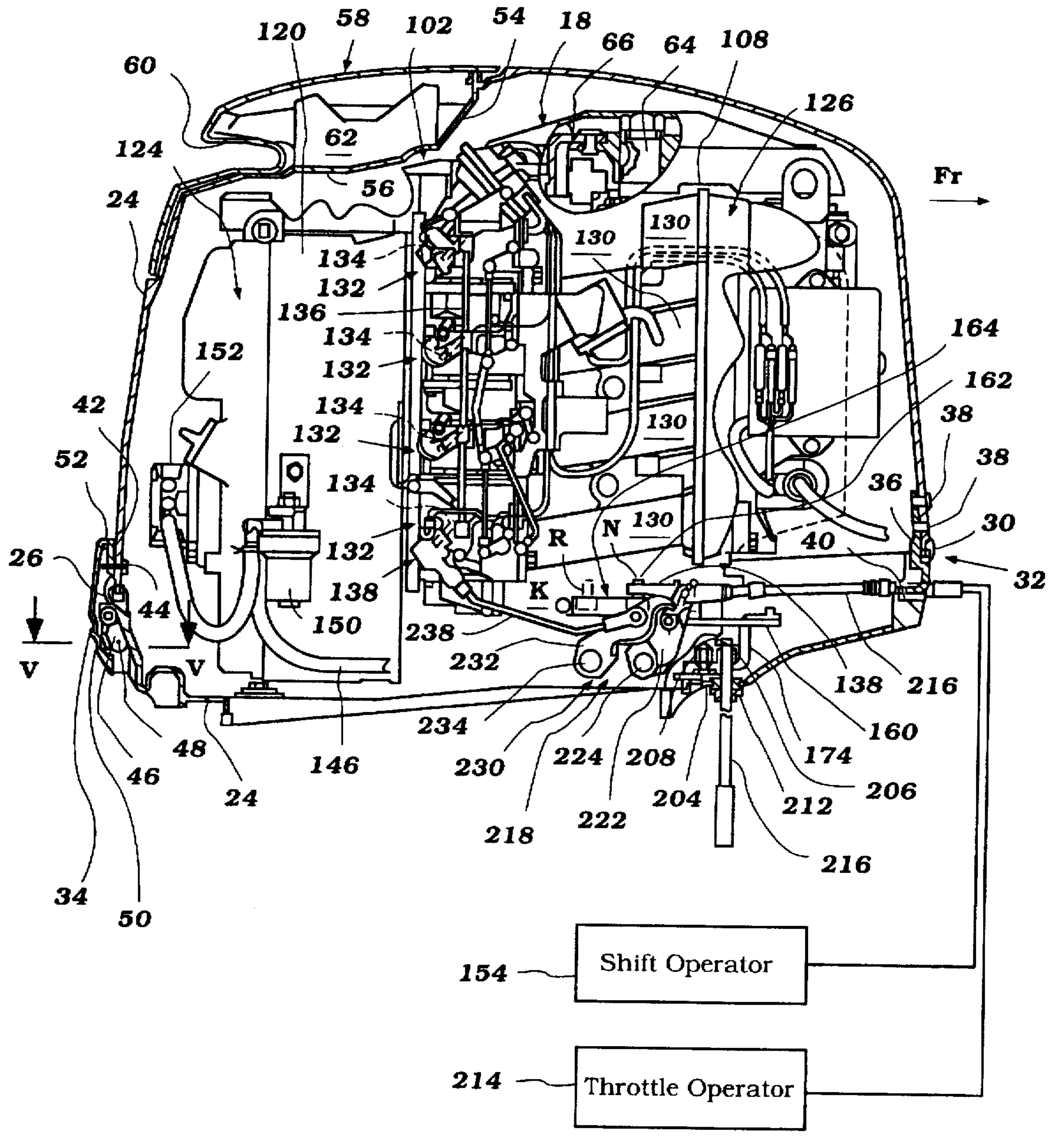
FIG. 2 is an enlarged, port side elevation of an engine of the outboard motor of FIG. 1 with a cowling assembly shown in cross-section.
Figure 5:
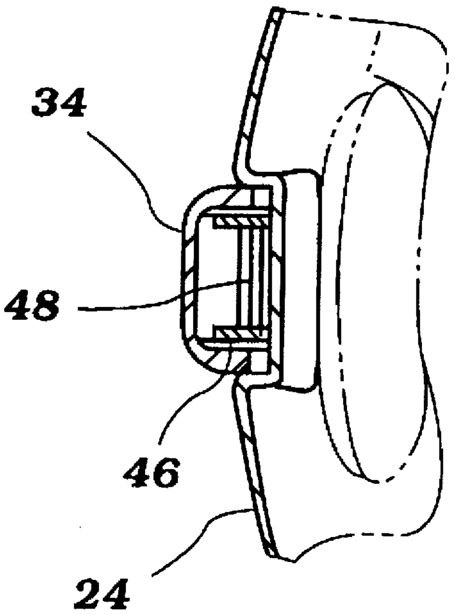
FIG. 5 is a cross-sectional view of the toggle latch of the cowling assembly of FIG. 2 taken along line 5—5.

As seen in FIGS. 2 and 5, the toggle latch 34 cooperates with a bracket 42 secured to the cowling. Fasteners 44 (e.g., bolts and nuts) secure the bracket 42 near the lower edge 28 of the cowling 24. Parallel links 46 secure the toggle latch 34 to the lower tray 22. A support pin 48 provides a hinged coupling between the links 46 and the lower tray 22 to allow an outer end of the links 46 to rotate relative to the lower tray 22. Another support pin 50 interconnects the links 46 and the toggle latch 34 to provide a hinge-type coupling between these components. An upper end of the toggle latch 34 defines a claw 52 that cooperates with a tang on the bracket 42. The claw 52 latches behind the tang when the toggle latch 34 is closed.

The toggle latch 34 locks the rear end of the top cowling 24 to the lower tray portion 22. With the latch 34 unlocked, the cowling 24 can be pivoted forward with the hook 32 rotating about the lug so as to expose a portion of the engine 18. In addition, with the latch 34 unlocked and the top cowling 24 partially rotated outwardly, the top cowling 24 can be slid out of engagement with the lower tray 22 and completely removed so as to expose the portion of the engine 18 which extends above the lower tray 22.

As illustrated in FIGS. 1 and 2, the cowling 24 includes a recess portion 54 formed at the upper rear corner of the top cowling 24. An aperture 56 is defined within the recess 54 and opens into the engine compartment of the cowling assembly 20. A handle insert 58 is affixed to the top cowling 24 within the recess 54 and over the aperture 56. The handle insert 58 includes an inlet opening 60 to allow ambient air to flow inside the handle insert 58, through the aperture 56, and into the engine compartment. The handle insert 58 also includes a baffle 62 disposed between the inlet opening 60 and the aperture 56. The baffle 62 encircles the aperture 56 to inhibit water flow into the engine compartment. As known in the art, the rear sloping shape of the cowling recess 54 funnels water toward the inlet opening 60 to drain the water removed from the influent air flow by the baffle 62. The inlet opening 60 also functions as a handle for raising and lowering the outboard motor 10.

As is typical with outboard motor practice, the engine 18 is supported within the power head 16 so that its crankshaft 64 rotates about a generally vertical axis. The crankshaft 64 drives a magneto generator/flywheel assembly 66 at its upper end, as well as a crankshaft pulley which drives a timing belt, as described below. The crankshaft 64 also drives a drive shaft 68 which depends from the power head 16 and rotates about the generally vertical axis.

As seen in FIG. 1, a drive shaft housing 70 extends from the lower tray 22 and terminates in the lower unit 72. The drive shaft 68 extends through the drive shaft housing 70 and is suitably journaled therein for rotating about the vertical axis.

The drive shaft 68 continues into a lower unit 72 where it drives a transmission 74 through an input gear. The transmission 74 selectively couples the drive shaft 68 to a propulsion shaft 76. The transmission 74 advantageously is a forward/neutral/reverse-type transmission. In this manner the drive shaft 68 drives the propulsion shaft 76 in any of these operational states, as described below in detail.

Although not illustrated in detail, the transmission 74 desirably includes at least one dog clutch which operates between a bevel gears. A pinion gear carried at the lower end of the drive shaft 68 drives the bevel gears in opposite directions. The clutch is coupled to the propulsion shaft. The clutch moves between a front position, in which the clutch engages the front bevel gear to drive the propulsion shaft 76 in a forward direction, a neutral position, in which the clutch is disengaged from the bevel gears, and a rear position, in which the clutch engages the rear bevel gear to drive the propulsion shaft 76 in a reverse direction.

The propulsion shaft 76 can drive a variety of different types of propulsion devices 78, such as, for example, a propeller or a hydrodynamic jet. In the illustrated embodiment, the propulsion device 78 is a single propeller having a plurality of propeller blades 80; however, it is understood that a counter-rotating, dual-propeller propulsion device can be used as well.

An exhaust system discharges engine exhaust from an exhaust manifold 82 of the engine 18. An exhaust manifold 82 of the engine 18 communicates with an exhaust conduit formed within an exhaust guide 84 positioned at the upper end of the drive shaft housing 70. The exhaust conduit of the exhaust guide 84 opens into an expansion chamber 86. The expansion chamber 86 is formed within the drive shaft housing 70. The expansion chamber 86 communicates with a discharge conduit 88 formed within the drive shaft housing 70 and the lower unit 72 that communicates with discharge passages 90 formed within the propulsion device 78. In this manner engine exhaust is discharged through the hub of the propeller 78 to a region of reduced pressure behind the propulsion device 78, as known in the art.

In addition, the exhaust system also includes an auxiliary exhaust conduit that places the expansion chamber 86 in communication with an above-surface exhaust vent 92. As seen in FIG. 1, the above-surface exhaust vent 92 desirably lies on the rear side of the drive shaft housing 70, just beneath the lower tray 22 of the power head 16. When excessive back pressure exits at the effluent end of the discharge conduit 88—such as when the when the propeller hub is submerged with the watercraft under an idle running condition—at least a portion of the exhaust gases flow from the expansion chamber 86, through the auxiliary exhaust conduit and discharge through the above-surface exhaust vent 92.

A conventional steering shaft assembly 94 is affixed to the drive shaft housing 70 by upper and lower brackets. The brackets support the shaft assembly 94 for steering movement. Steering movement occurs about a generally vertical steering axis which extends through the steering shaft of the steering shaft assembly 94. A steering arm 96 which is connected to an upper end of the steering shaft can extend in a forward direction for manual steering of the outboard drive 10, as known in the art.

The steering shaft assembly 94 also is pivotably connected to a clamping bracket 98 by a pin 100. The clamping bracket 98, in turn, is configured to attach to the transom 12 of the watercraft 14. This conventional coupling permits the outboard motor 10 to be pivoted relative to the pin 100 to permit adjustment of the trim position of the outboard motor 10 and for tilt up of the outboard motor 10.

Although not illustrated, it is understood that a conventional hydraulic tilt and trim cylinder assembly, as well as a conventional hydraulic steering cylinder assembly, can be used as well with the present outboard motor 10. The construction of the steering and trim mechanism is considered to be conventional, and for that reason further description is not believed necessary for appreciation or understanding of the present invention.

Figure 12:
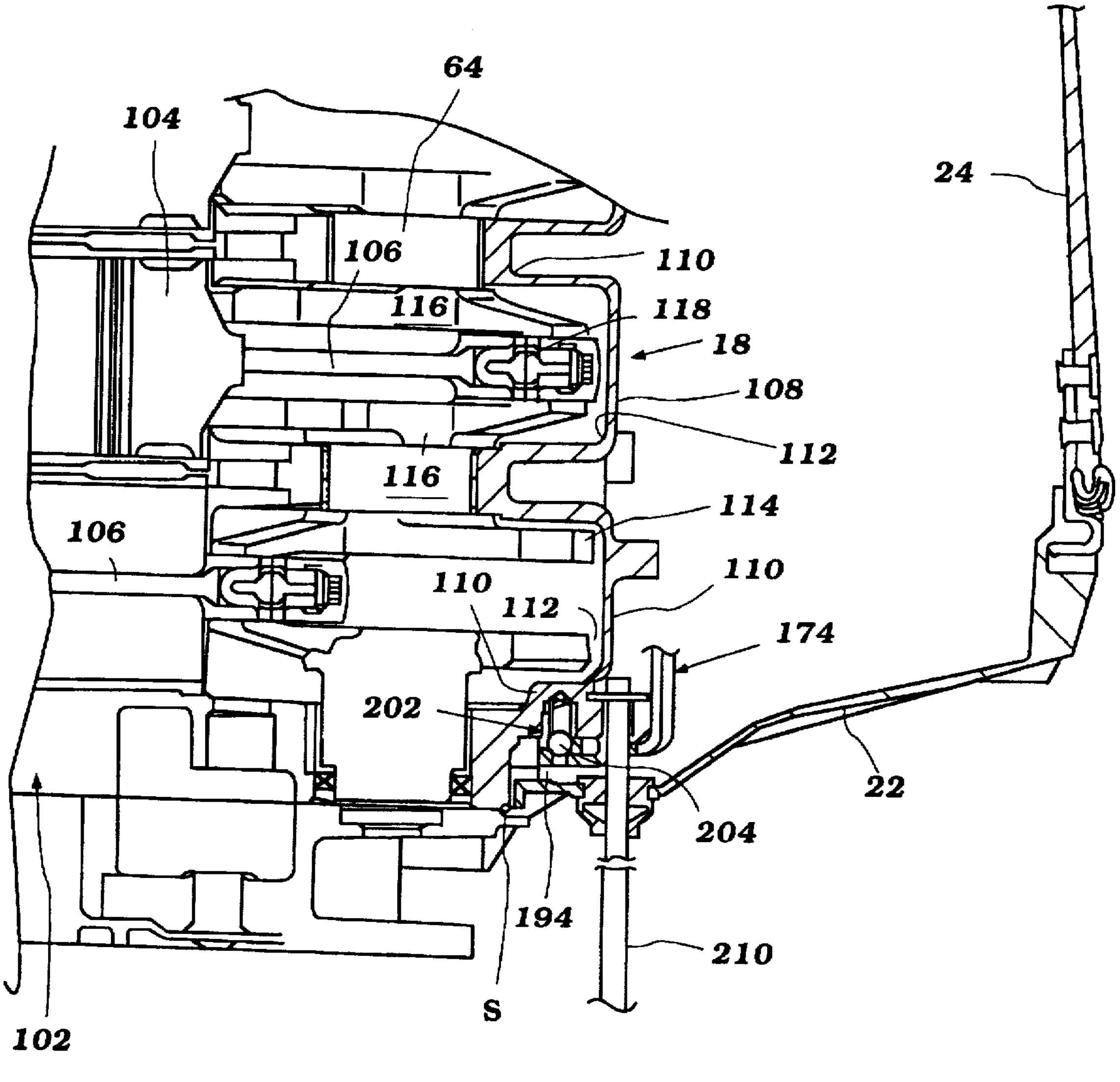
FIG. 12 is a cross-sectional view of a portion of the engine of FIG. 6 taken along line 12—12.
Figure 13:
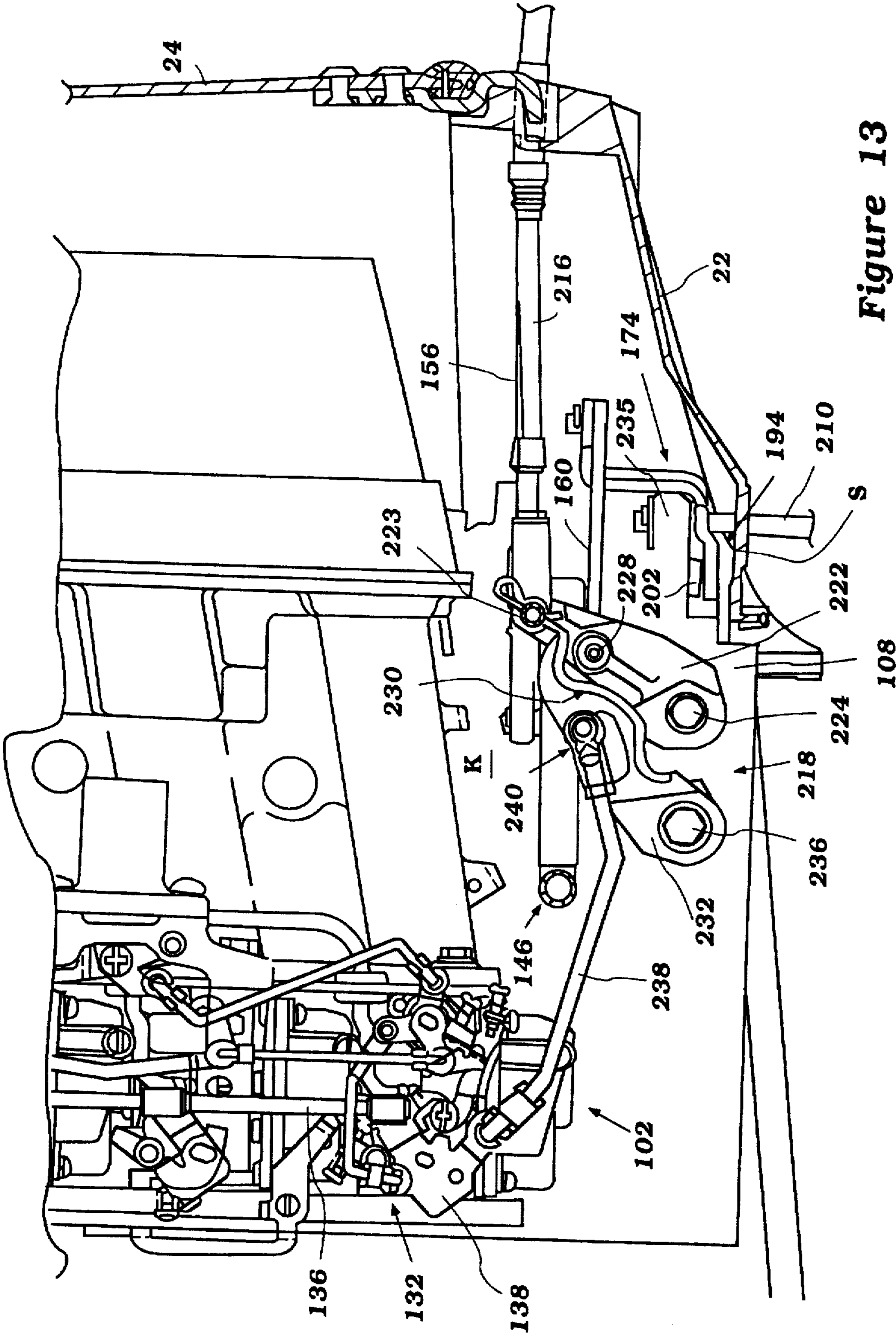
FIG. 13 is an enlarged, partial, port side elevational view of the throttle control arrangement of FIG. 2.

As seen in FIGS. 2 and 12, the engine 18 includes a cylinder block 102, which in the illustrated embodiment defines four in-line cylinder bores. Pistons 104 reciprocate within the cylinder bores, and connecting rods 106 link the pistons 104 to the crankshaft 64 so that reciprocal linear movement of the pistons 104 within the cylinder bores rotate the crankshaft 64 in a known manner.

A crankcase member 108 is attached to the cylinder block 102 and surrounds at least a portion of the crankshaft 64. The crankshaft 64 is journaled within a crankcase chamber, which is formed by the crankcase member 107 and a portion of the cylinder block 102, so as to rotate about the generally vertical axis.

As seen in FIG. 12, the crankcase member 108 includes a plurality of walls 110 that define a series of spaced recesses 112. The recesses 112 are sized and arranged to receive the eccentric portions of the crankshaft 64 as it rotates. For instance, a counterweight 114 as well as corresponding rod throws 116 and a rod journal 118 of the crankshaft 64 rotate through the respective recess 112 defined between the walls 110 of the crankcase member 108.

On the opposite end of the cylinder block 102, a cylinder head 120 is attached to close an end of the cylinder bores. The cylinder head 120 generally has a conventional construction and supports a plurality of intake and exhaust valves. The cylinder head 120 also journals and houses at least one camshaft, which operates the valves.

The valve operation mechanism can be any of a variety of conventional mechanisms. For instance, the overhead camshaft can actuate rocker arms journaled about a rocker shaft to operate the valves within the cylinder head assembly 120. Alternatively, a plurality of overhead camshafts (e.g., intake and exhaust camshafts) can operate the valves directly using tappets, or can be located to the side of the cylinders to operate the valves via push rods, as known in the art. Because the present invention deals primarily with the construction of the throttle linkage system, it is believed unnecessary to provide further description of the particular valve operating mechanism beyond that provided above.

An intake manifold 122 (best seen in FIG. 3) forms a portion of the cylinder head assembly 120. The intake manifold 122 includes a plurality of runners. Each individual runner communicates with an individual combustion chamber of the engine 18 through the intake valve system (not shown).

A cam cover 124, together with a cylinder head assembly 120, defines a cam chamber in which the valves, camshafts, and related valve operating mechanism are located. The cam cover 124 is attached to the cylinder head 120 on a side opposite that of the cylinder block 120.

The timing belt extends between the crankcase pulley and a pulley coupled to the camshaft. As known in the art, the pulley has a diameter twice that of the pulley of the crankshaft, so that the crankshaft 64 drives a camshaft at half the rotational speed of the crankshaft. Although not shown, an upper cover covers the external belt and pulleys, as well as the magneto generator/flywheel assembly 66.

The engine 18 also includes an induction system. An intake silencer 126 of the induction system is disposed to the front side of the power head 16 and on one side of the crankcase member 108. The intake silencer 126 draws air into the engine 18 through at least one air inlet 128 from the interior of the cowling 20 and silences the intake air charge.

As seen in FIG. 2, a series of induction pipes 130 deliver air from the intake silencer 126 to a plurality of charge formers 132. The lengths of the induction pipes 130 desirably are tuned with the intake silencer 132 to minimize the noise produced by the induction system, as known in the art.

The charge formers 132 produce a charge of air and fuel which is delivered to the plurality of runners of the intake manifold 122. In the illustrated embodiment, the charge formers 132 are a plurality of vertically aligned carburetors, each connected to one of the induction pipes 130. It should be understood, however, that although the invention is described in conjunction with a carbureted engine, certain facets of the invention may be employed in connection with other types of charge formers, such as fuel injectors or the like.

The carburetors may be of any known type and construction. In the illustrated embodiment, each carburetor 132 includes a fuel bowl to which fuel is emitted through a float control valve (not shown) so as to maintain a uniform head of fuel therein. A main discharge tube delivers fuel from the fuel bowl to a Venturi restriction in an air horn of the carburetor body.

Each carburetor 132 also desirably has a throttle valve 134 to regulate the mixture of fuel and air to each cylinder of the engine 18, as known in the art. A throttle shaft of the carburetor 132 supports the throttle valve 134 within the air horn of the carburetor 132. The throttle valve 134 desirably is a butterfly-type valve; however, it is understood that other types of valves, such as slider valves, can be used as well. Rotation of the throttle shaft controls the orientation of the throttle valve 134 within the air horn, as known in the art.

As seen in FIG. 2, the carburetors 132 are attached between the induction pipes 130 and the runners of the intake manifold 122. The carburetors 132 are attached to an intake manifold flange by means that include a common insulator assembly, such that each carburetor 132 delivers a charge to the corresponding intake runners of the intake manifold 122.

A throttle linkage 136 interconnects the throttle shafts of the carburetors 132 to operate the throttle valves 134 in unison. The throttle linkage 136 is formed in part by a plurality of throttle levers interconnected by a throttle rod. Clips connect the throttle rod to the throttle levers.

A lowermost lever 138 acts as a drive lever for the linkage system 136. A throttle actuation system actuates the throttle linkage 136 through the drive lever 138, as discussed below.

A fuel supply system delivers fuel to the charge formers 132. In the illustrated embodiment, as best seen in FIGS. 2 and 6–9, an external fuel pump 140 delivers fuel from a remote fuel tank 142 (usually located within the hull of the watercraft 14) to a fuel supply line 144. The fuel supply line 144 communicates with a main fuel conduit 146 located within the cowling 24 through a quick disconnect coupling 148 positioned at the front side of the lower tray 22. The quick disconnect coupling 148 provides for a detachable connection to the fuel supply line 144.

The main fuel conduit 146 extends from the quick disconnect coupling 148 to a fuel filter 150 mounted on the side of the cylinder head assembly 120. A fuel pump 152 draws fuel through the fuel filter 150. The cam shaft of the engine 18 operates the fuel pump 152. The fuel pump 152 includes a plurality of effluent ports which communicate with the charge formers 132 via conduits routed through the intake manifold runners.

With reference to FIGS. 2 and 6–15, a transmission control system operates the transmission 74. The transmission control system includes a remotely located shift operator 154 (schematically illustrated in FIG. 2) that controls a shift actuation mechanism. In the illustrated embodiment, the shift operator 154 is located on the steering arm 96 of the outboard motor 10; however, the shift operator 154 also can lie either in the hull of the watercraft 14 or within or adjacent to the power head 16 of the outboard motor 10.

A bowden-wire-type shift cable 156 couples the shift operator 154 to the shift actuation mechanism. A fitting 158 at the end of the shift cable 156 is attached to an end of a link 160. In the illustrated embodiment, a pivot pin 162 interconnects the cable fitting 158 and the link 160 in order to permit relative rotational movement between these components.

Figure 6:
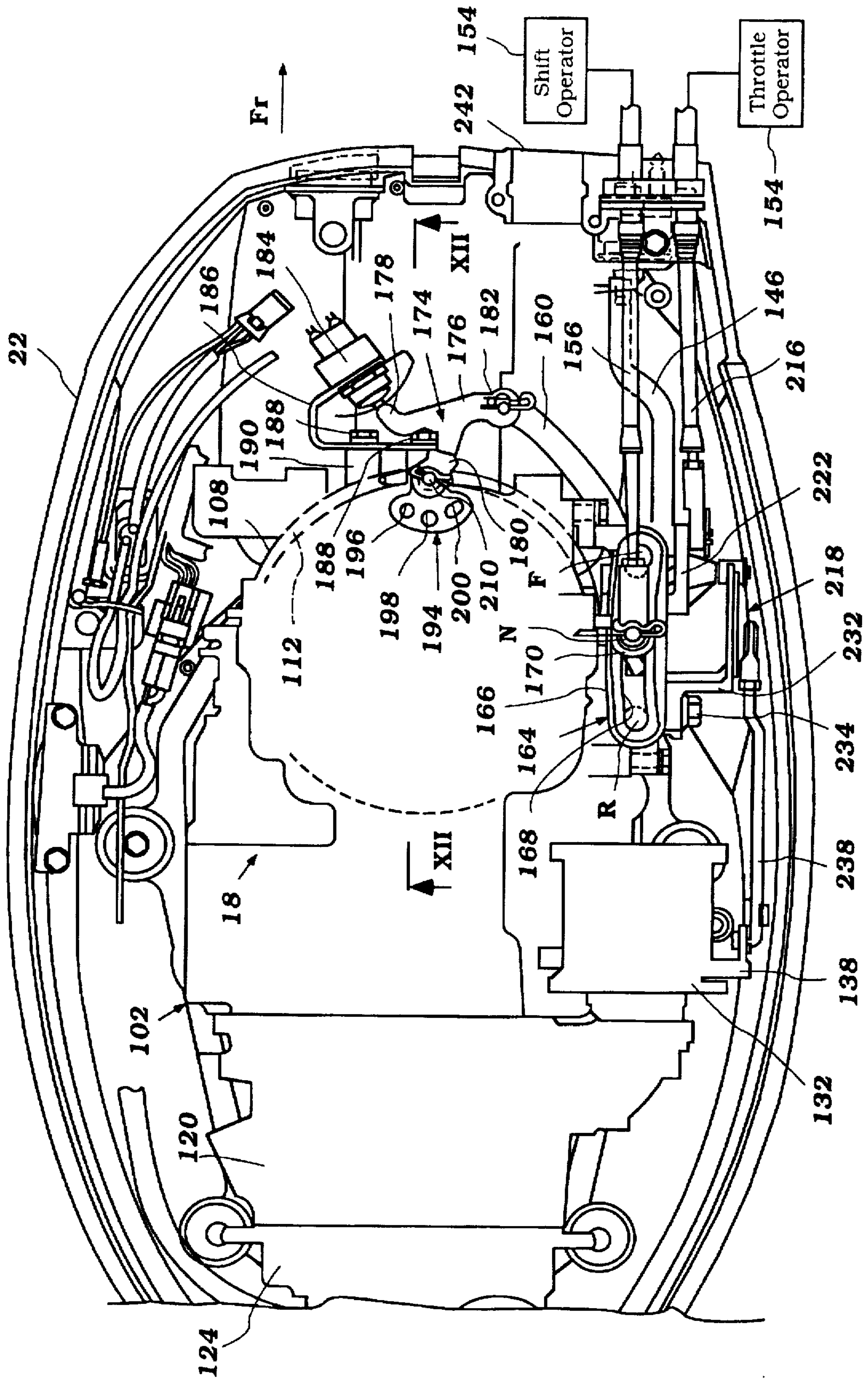
FIG. 6 is a top plan view of the engine of FIG. 2 illustrating the position of the crankcase member relative to a shift position mechanism of the shift control arrangement.
Figure 11:
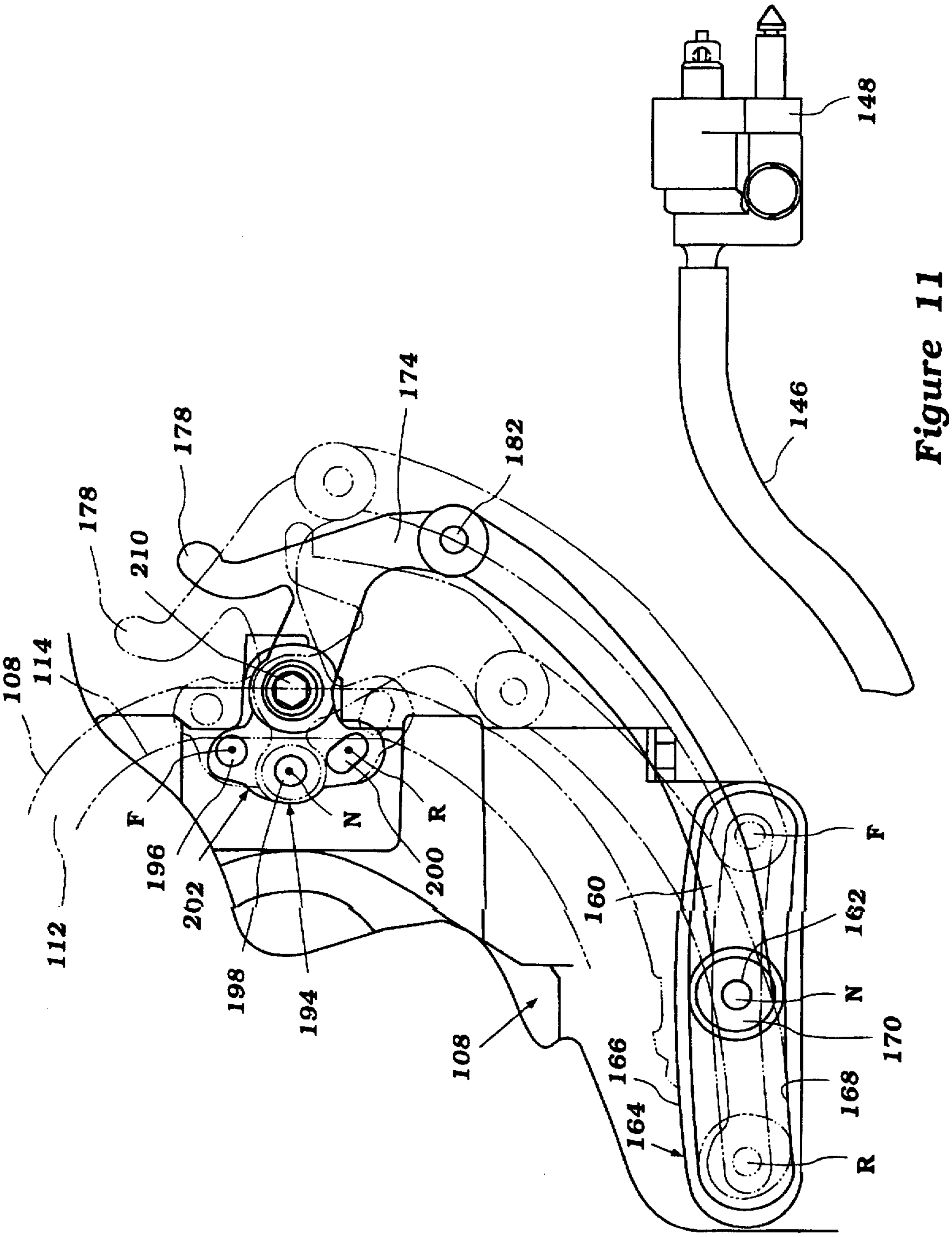
FIG. 11 is an enlarged top plan view of a portion of the shift control arrangement of FIG. 2.

A guide mechanism 164 supports the pivotable coupling between the cable fitting 158 and the link 160. As best seen in FIGS. 6 and 11, the guide mechanism includes a cam member 166 that defines a slot or cam groove 168. The groove 168 has a slightly arcuate shape which curves away from the engine 18. A roller 170 supports and journals the pivot pin 162 within groove 168.

A bracket 172 (FIG. 14) supports the guide mechanism 164 next to the crankcase 108 of the engine 18. The guide mechanism 18 desirably lies in a space K below the intake silencer 126 and induction pipes 130 in order to reduce the girth of the engine 18. This location also protects the guide mechanism 164 and the link 160, while allowing the guide mechanism 164 to be accessible without substantial disassembly of the engine 18.

An opposite end of the link 160 is connected to an end of a shift control lever 174. In the illustrated embodiment, as seen in FIG. 6, the shift lever 174 has a generally Y-shape in a plan view, formed by a base leg 176 and first and second arms 178, 180. A pivot pin 182 connects a base leg 176 of the shift lever 174 to the end of the link 160. The first arm 178 extends away from the base leg 176 and includes a hooked end. The hooked end defines a smooth contact surface with cooperates with a shift detection sensor 184 that determines when the transmission 74 is shifted between drive conditions.

In the illustrated embodiment, the shift detection sensor 184 is a contact switch that is actuated by the contact surface of the shift lever 174, as described below. A bracket 186 supports the sensor 184 in front of the crankcase member 108 at a position near the lower end of the engine 18. Bolts 188 support the bracket 186 in this position. The bolts 188 thread into apertures formed in bosses 190 that extend from the crankcase member 108.

Figure 10:
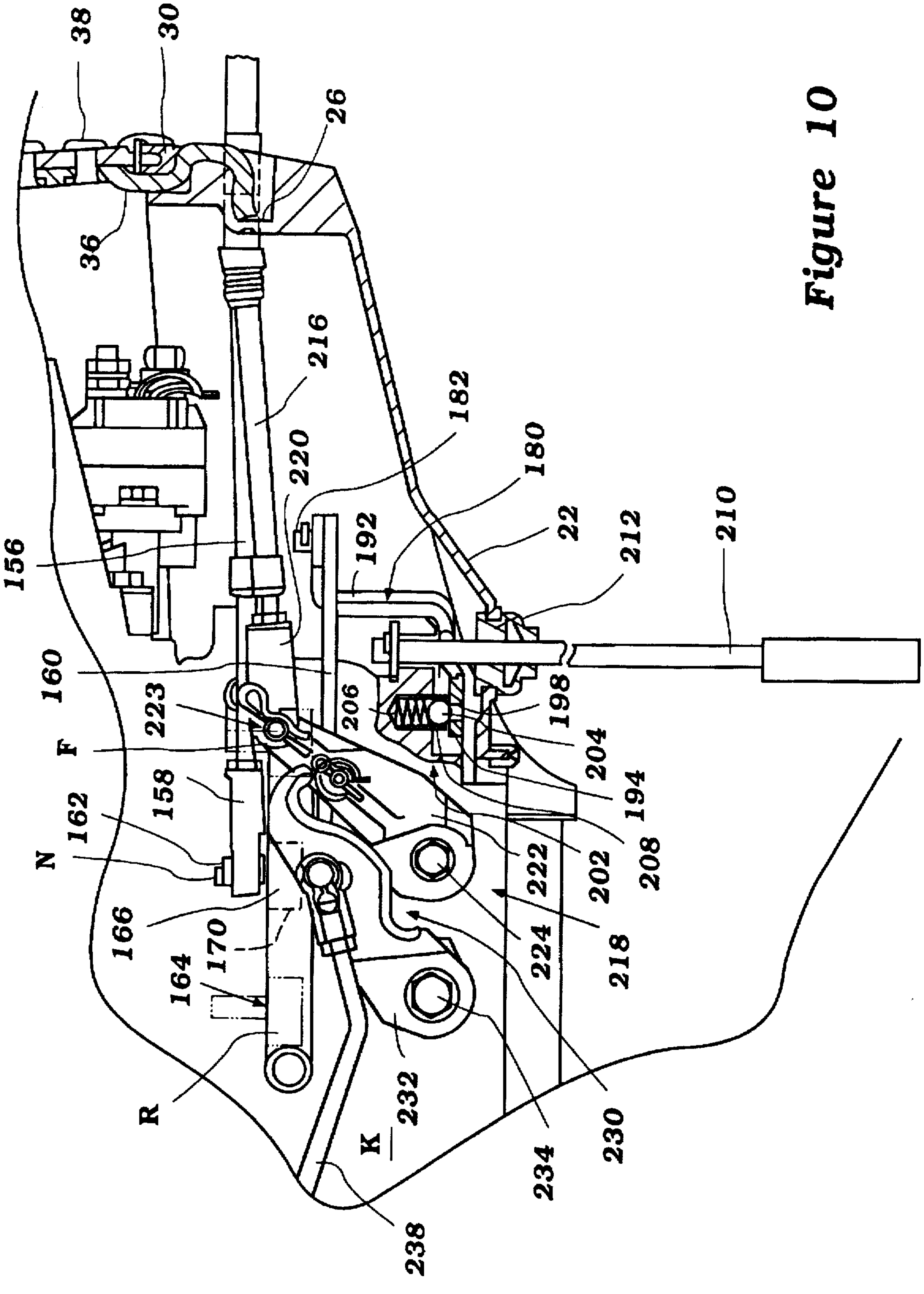
FIG. 10 is an enlarged, partial port side view of the shift position mechanism of FIG. 8.

As best seen in FIG. 10, the second arm 180 of the shift lever 174 includes a vertical jog 192. A portion of the second arm 180 thus lies below the base leg 176 and the first arm 178 of the shift lever 174. An outer end of the shift lever second arm 180 defines a positioning plate 194 (best seen in FIG. 6. The positioning plate 194 includes a plurality of apertures which correspond in number to the number of drive conditions of the transmission 74. In the illustrated embodiment, the positioning plate includes three apertures 196, 198, 200 for the three operation states of the engine 18: forward, neutral, reverse. The spacing between the apertures 196, 198, 200 corresponds with the rotational degree necessary to move the transmission 74 between operational states in the manner described below. As seen in FIG. 6, the aperture 200 that corresponds to the reverse position has an elongated shape. The elongated shape permits adjustment within the shift actuation mechanism to calibrate the relative positions of the shift actuation mechanism to the clutch position of the transmission 74 when in the different operational states.

A detent mechanism 202 of a shift position device cooperates with the position plate 194. As best seen in FIG. 10, the detent mechanism 202 is positioned above the position plate 194 and includes a detent ball 204 that engages one of the apertures 196, 198, 200 of the position plate 194, depending upon the operational condition of the transmission 74. A biasing mechanism 206, such as a spring, biases the detent ball 204 into engagement with the position plate 194. A cage 208 houses the detent ball 204 and the biasing mechanism 206 with the detent ball 204 projecting only partially from the cage 208.

The detent mechanism and the position plate 204 of the shift positioning mechanism desirably lie beneath a wall 110 of the crankcase member 108 that defines the lowermost recess 112 of the crankcase chamber. In this position, the shift position mechanism is distanced from the inlet air stream into the engine 18 in a protected space S (FIG. 12) defined between the crankcase member 108 and the lower tray 22.

A shift control rod 210 is fixed to the lower portion of the shift lever second arm 180 between the position plate 194 and the vertical jog 192. The shift control rod 210 also is journalled on either side of the point of attachment between the shift control rod 210 and the shift lever 174. A boss of the crankcase member 108 supports the upper end of the shift control rod 210, and a bushing 212 support the shift control rod 210 just below crankcase member 108. In the illustrated embodiment, the lower tray 22 of the cowling assembly 20 supports the bushing 212 in this position.

The shift control lever 174 thus is coupled to an upper end of the upper shift control rod 210. As understood from FIG. 2, the shift control rod depends from the power head 16, desirably from a location beneath the crankcase member 108. Although not show, a lower shift control rod is splined to the lower end of the upper shift control rod 210 and depends into the lower unit 72 to a point near the transmission 74.

The lower shift control rod operates a conventional shift actuator to change the drive condition of the transmission 74. For instance, the shift actuator can include a cam connected to the lower end of the lower shift control rod. The cam cooperates with a follower that is supported at one end of the propulsion shaft 76. A shift plunger is connected to the follower in a manner allowing the shift plunger to rotate with the propulsion shaft 76 while able to reciprocate between positions along the axis of the propulsion shaft 76 upon rotation of the cam. This reciprocating linear movement of the plunger moves a dog clutch sleeve of the transmission 74 to force the dog clutch into and out of engagement with the gears of the transmission 74, as known in the art.

With reference to FIGS. 2, 6, 10 and 13–15, a throttle control system operates the throttle devices 134 of the charge formers 132. The throttle control system includes a remotely located throttle operator 214 (schematically illustrated in FIG. 2) that controls a throttle actuation mechanism. In the illustrated embodiment, the throttle operator 214 is located on the steering arm 96 of the outboard motor 10; however, the throttle operator 214 also can lie either in the hull of the watercraft 14 of within or adjacent to the power head 16 of the outboard motor 10.

A bowden-wire-type throttle cable 216 couples the throttle operator 214 to a throttle actuation mechanism 218. A fitting 220 at the end of the throttle cable 216 is attached to a throttle lever 222. In the illustrated embodiment, a pivot pin 223 interconnects the cable fitting 220 to the throttle lever 222 in order to permit relative rotational movement between these components.

Figure 14:
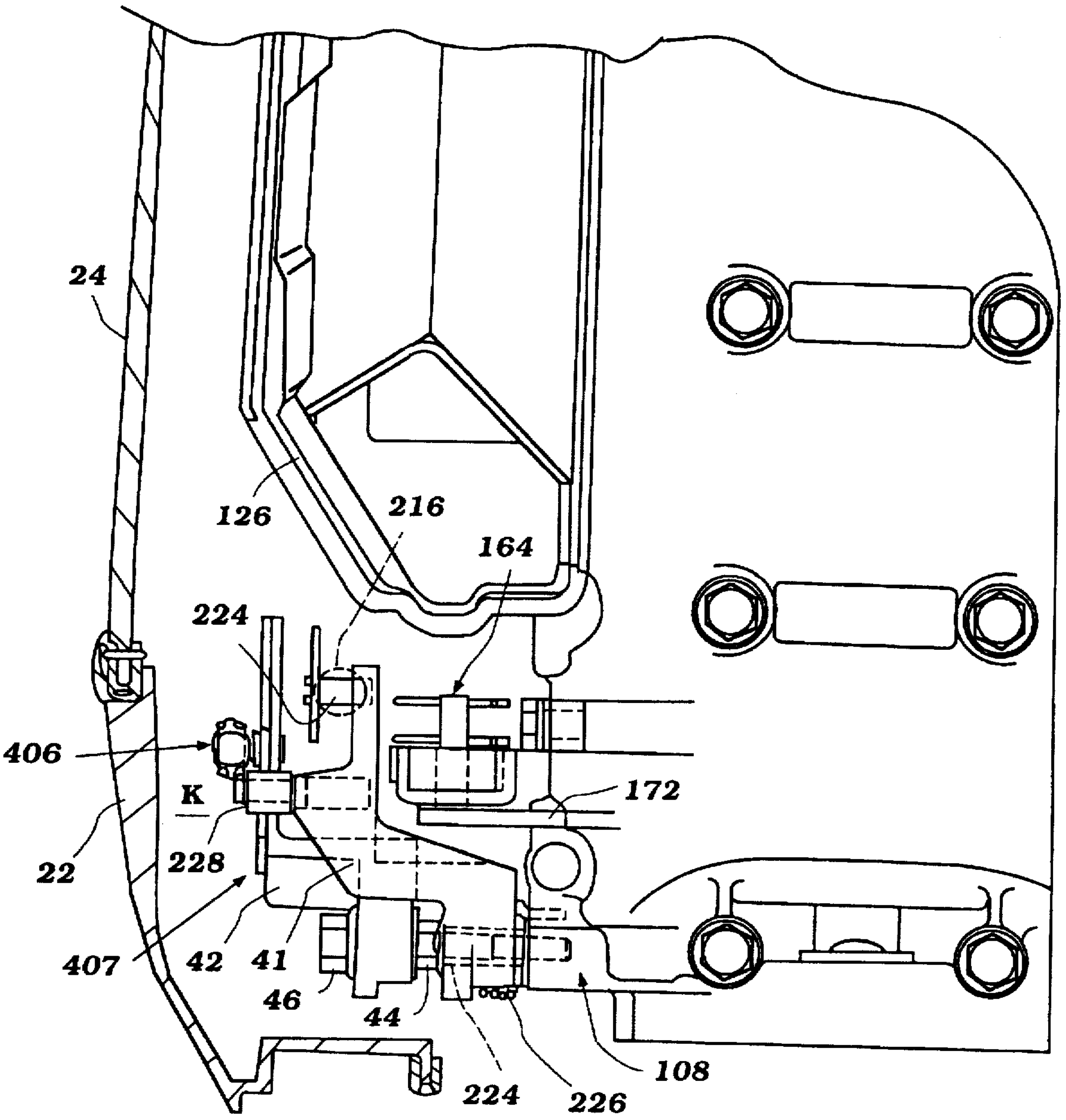
FIG. 14 is an enlarged, partial, front elevational view of the throttle control arrangement of FIG. 13.

As best seen in FIG. 14, the opposite end of the throttle lever 222 is supported by the crankcase member 108 in a rotatable manner. That is, the throttle lever 222 pivots about a shoulder bolt 224 that secures the throttle lever 222 to the engine 18. A biasing mechanism 226 operates between the throttle lever 222 and the crankcase member 108 to bias the throttle lever 222 in one rotational direction which corresponds to the direction in which the throttle devices 134 are closed. In the illustrated embodiment, the biasing mechanism 226 comprises a helical spring positioned about the support bolt 224.

The throttle lever 222 also includes a drive follower 228 which is located toward the end to which the cable fitting 220 is attached. The drive follower 222 cooperates with a cam surface 230 on a throttle cam 232. As understood from FIGS. 10 and 14, the throttle cam 232 lies to the side of and just behind the throttle lever 222 so as to align the cam surface 230 of the throttle cam 232 behind the drive follower 228 of the throttle lever 222.

Figure 15:
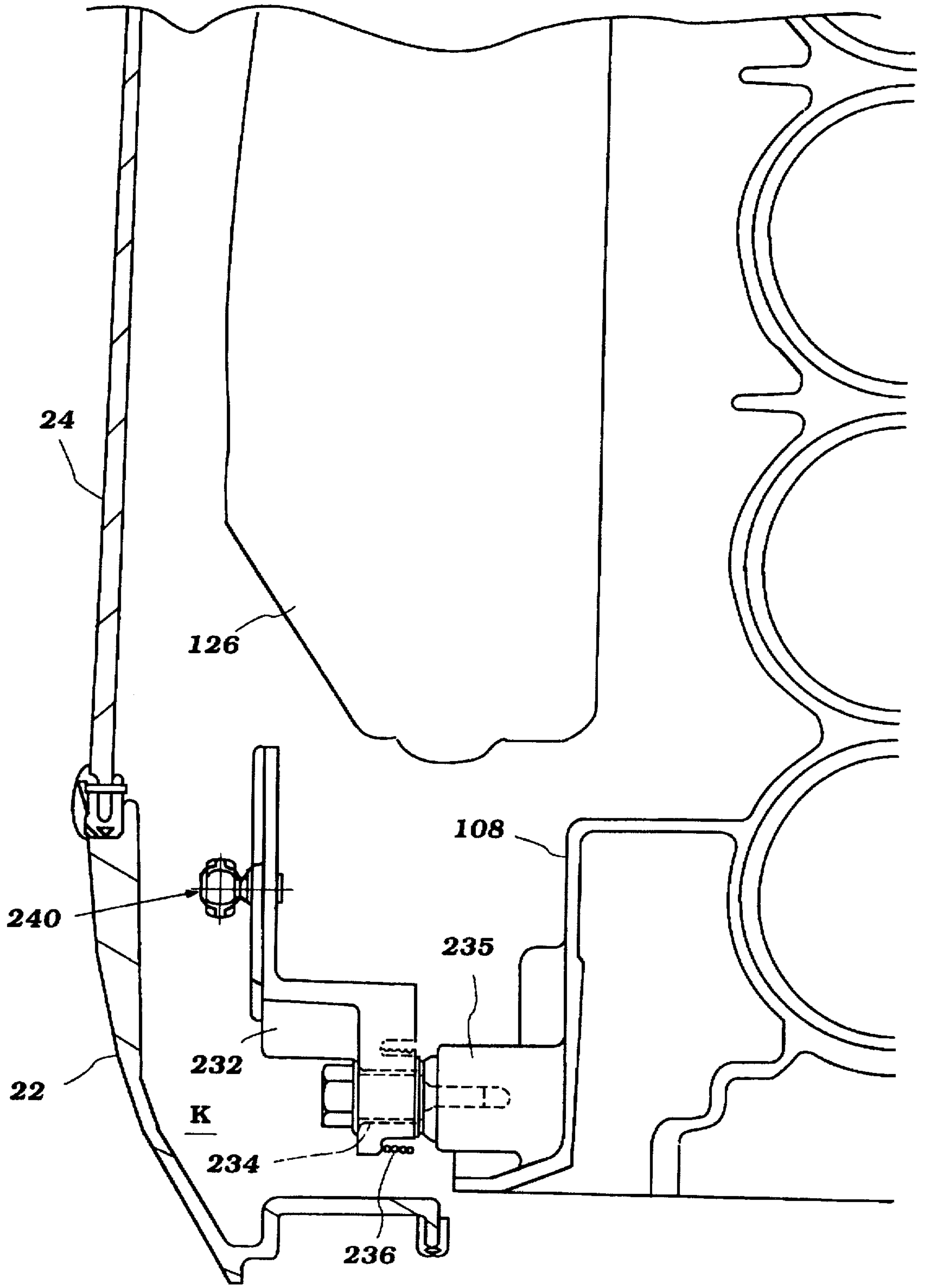
FIG. 15 is an enlarged, partial, front elevational view of a cam member of the throttle control arrangement of FIG. 14.

As seen in FIG. 15, a lower end of the throttle cam 232 is supported by the crankcase member in a rotatable manner. For this purpose, a shoulder bolt 234 secures the throttle cam 232 to the engine 18 while the throttle cam 232 can rotate relative to the bolt 234. A boss 235, which is formed on the crankcase member 108, supports the throttle cam 232 in the desired position.

A biasing mechanism 236 operates between the throttle cam 232 and the crankcase member 108 to bias the throttle cam 232 in one rotational direction. The biasing mechanism 236 desirably biases the throttle cam 232 in a direction that corresponds with the direction in which the throttle devices 134 are closed. In the illustrated embodiment, the biasing mechanism 236 comprises a helical spring positioned about the support bolt 234.

A link 238 interconnects the throttle cam 232 to the drive throttle lever 138 of the throttle linkage system 136. A pivotably coupling 240 connects one end of the link 238 to the throttle cam 232. The link 238 desirably is bent such that its movement with the throttle cam 232 does not interfere with the charge formers 132, or with any of the other engine components positioned near the charge formers 132.

The throttle lever 222 and the throttle cam 232 desirably are positioned within the space K located beneath the induction pipes 130 and the intake silencer 126. These components of the throttle actuation mechanism 218 also desirably lie in a side-by-side arrangement with the guide mechanism 164 of the shift actuation mechanism. This arrangement of the throttle and shift control mechanisms presents a compact configuration to reduce the girth of the engine 18, and thus the size of the power head 16.

Figure 7:
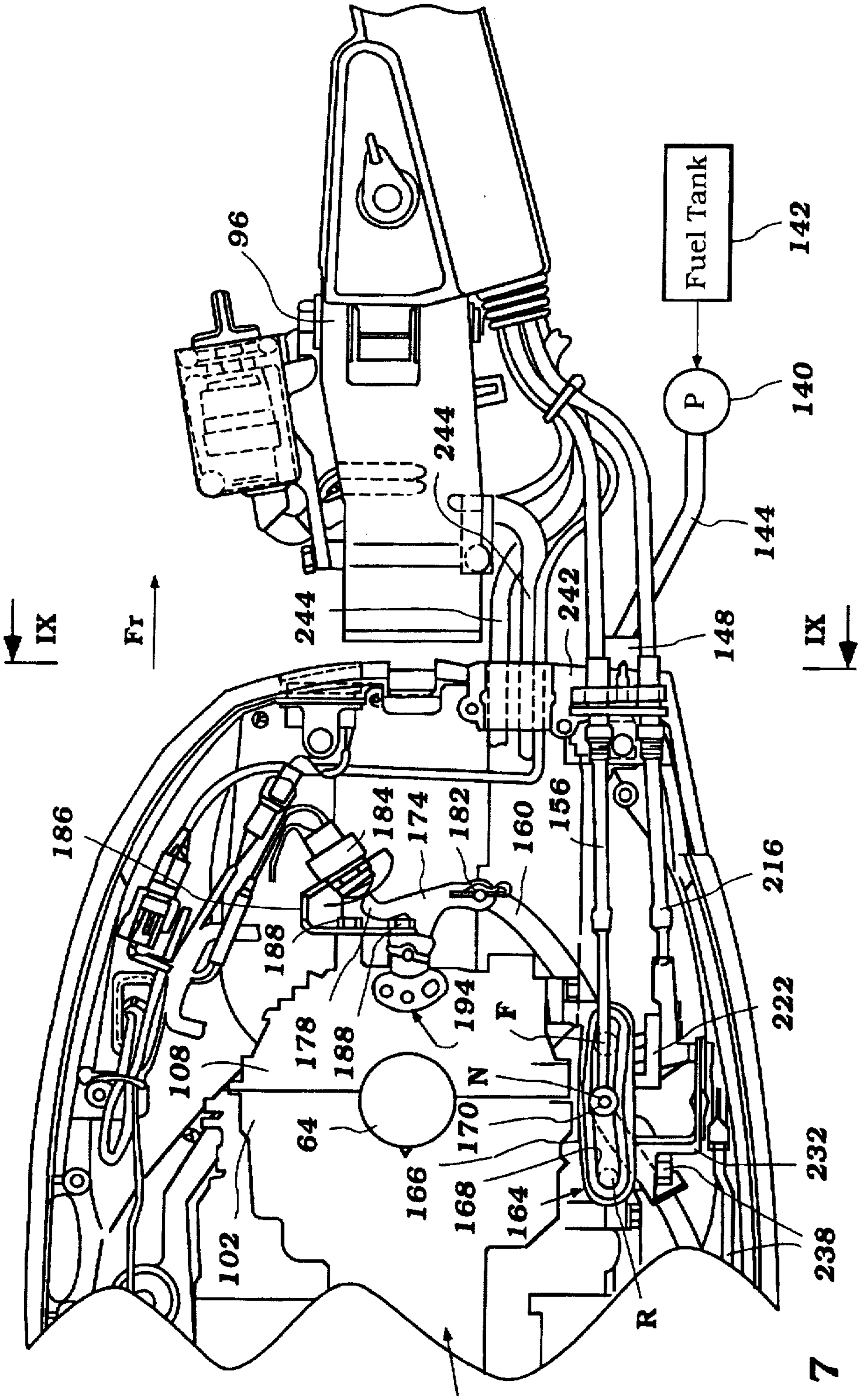
FIG. 7 is an enlarge top plan view of the engine of FIG. 6.
Figure 8:
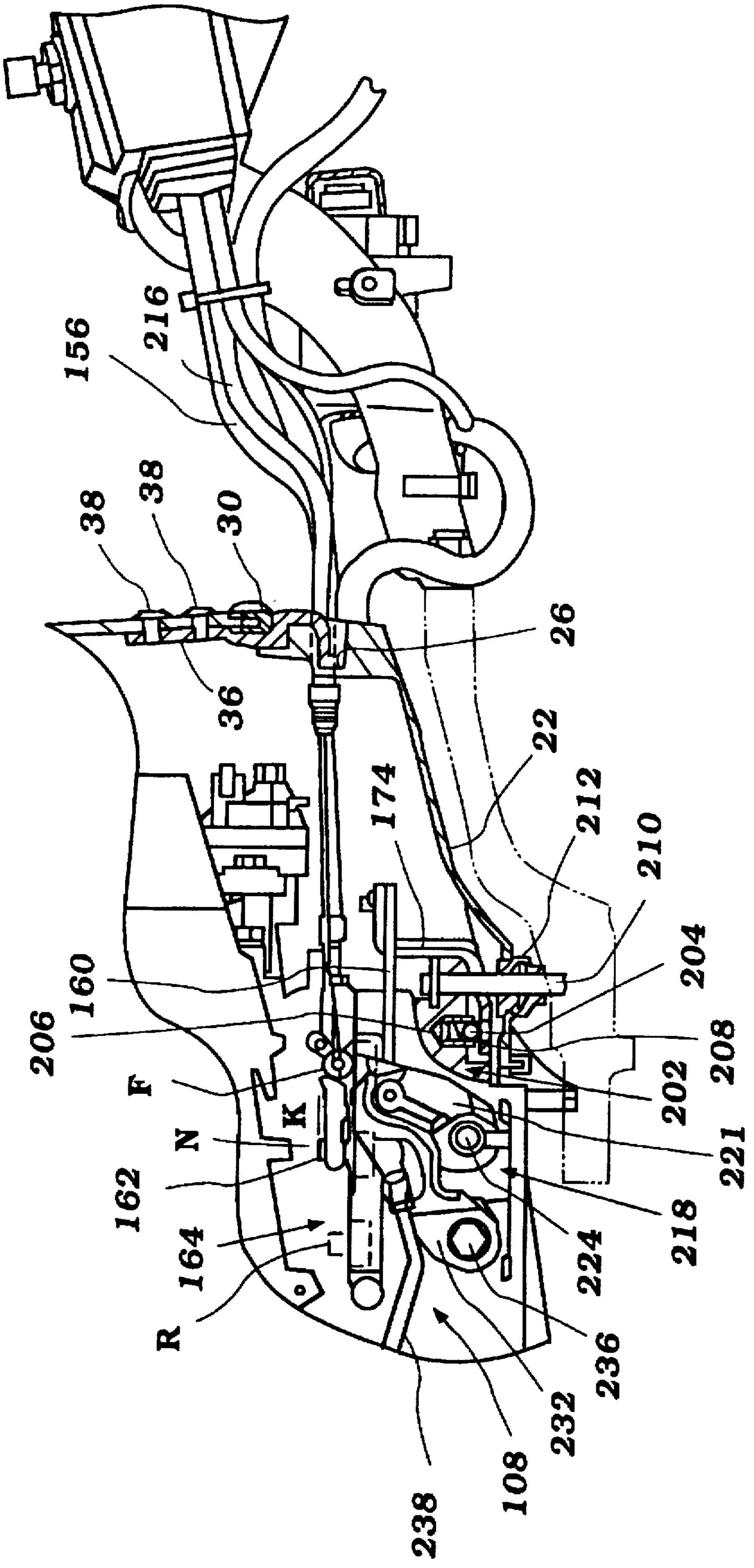
FIG. 8 is an enlarged, partial port side view of the shift position mechanism of FIG. 6.

As seen in FIG. 7, the shift cable 156 and the throttle cable 216 extend generally parallel to each other within the cowling 24. The cables 156, 216 pass through a mounting plate 242 positioned on the front side of the lower tray 22. The cables 156, 216 also extend generally in parallel to each other on the external side of the mounting plate 242 toward their respective operators 154, 214.

Figure 9:
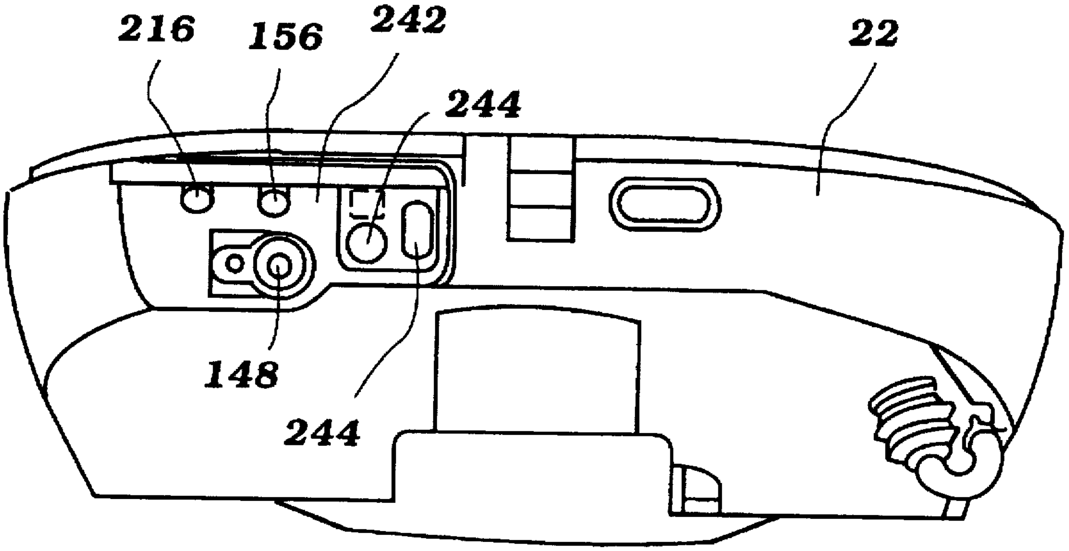
FIG. 9 is a front elevational view of a lower tray of the cowling assembly of FIG. 2 taken in the direction of line 9—9 of FIG. 7.

The mounting plate 242 also supports the quick-disconnect coupling 148 for the fuel line. As seen in FIG. 9, the quick-disconnect coupling 148 desirably lies below the point where the throttle and shift cables 156, 216 pass through the mounting plate 242.

The mounting plate 242 also supports several electrical cables 244 which communicate with electrical components of the engine 18. For instance, at least one of the electrical cables 244 places a remote battery in communication with an electrical component of the engine 18 (e.g., an electric starter motor). The electric cables 244 desirably pass through the mounting plate 244 to the side of the throttle and shift cables 156, 216. Alternatively, the mounting plate 242 can support terminal connectors to which the electrical cables 244 connect.

FIG. 10 illustrated the shift actuation mechanism in the neutral position N. In operation, the shift operator 154, through the shift cable 156, moves the cable fitting 158 either toward a forward position F or a reverse position R. Movement of the cable fitting 158 in this manner slides the pivot pin 162 and the roller 170 along the cam slot 168 of the guide mechanism 164. The pivot pin 162 transfers the motion of the cable fitting 158 to an end of the link 160 of the shift actuation mechanism.

FIG. 11 illustrates the movement of the link 160 between the forward position F, the neutral position N, and the reverse position R. Movement of the cable fitting 158 toward the forward position forces the attached end of the link 160 in the forward direction. The link 160 and the coupled shift lever 174 consequently move forward about the illustrated arc. This movement causes the shift lever 174 to rotate about the axis of the shift control rod 210, which in turn causes the shift control rod 210 to rotate about its own axis to actuate the transmission 74 which, as noted above, can be accomplished in any of a variety of conventional manners.

Rotation of the shift lever 174 also rotates the position plate 194 of the lever 174. The detent ball 204 disengages from the aperture 198 corresponding to the neutral position of the transmission 74 as the position plate 194 rotates with the shift lever 174. Once the shift control rod 210 has moved the clutch of the transmission 74 into engagement with the corresponding gear, the detent ball 204 engages the aperture 196 of the position plate 194 that corresponds to the forward position. The engagement between the detent ball 204 and the aperture 196 of the position plate 194 releasable locks the transmission 74 in the forward position and provides a tactile indication to the watercraft operator that the transmission 74 has engaged under a forward drive condition.

The operation of the shift actuation mechanism when disengaging the transmission 74 (i.e., establishing a neutral drive condition) as well as when engaging the transmission 74 under a reverse drive condition is substantially identical to that described above, except that the components of the shift actuation mechanism move and rotate in a direction opposite to that described above.

The rotational movement of the shift lever 174 also causes the first arm 178 of the shift lever 174 to actuate the shift detection sensor 184. As the shift lever 174 moves toward the neutral position N, the first arm 178 of the shift lever 174 contacts the sensor 184 to actuate a switch within the sensor 184. The sensor 184 in response produces a signal which indicates that the transmission 74 has been shifted between drive conditions.

FIG. 10 also illustrates the throttle actuation mechanism 218 in an idle position. In operation, the throttle operator 214, through the throttle cable 216, moves the cable fitting 220 in the rear direction. The cable fitting 220 in turn drives the throttle lever 222 to rotate about its supporting bolt 224 toward the throttle cam 232. The spacing between the drive follower 228 of the throttle lever 222 and the cam surface 230 of the throttle cam 232 produces a lost-motion connection such that the initial movement of the throttle lever 222 does not move the throttle cam 232.

Once the drive follower 228 engages the cam surface 230 of the throttle cam 232, further rearward movement of the throttle cable fitting 220 causes the throttle cam 232 to rotate with the throttle lever 222. The drive follower 228 rolls over the cam surface 230 of the throttle cam 232 during this operation.

The link 238 transfers the rotational movement of the throttle cam 232 to the drive throttle lever 138 which actuates the throttle shaft of the lowermost carburetor 132. The linkage system 136 communicates the motion of the drive throttle lever 138 to the other throttle levers to operate the throttle valves 134 in unison.

As understood from FIGS. 14 and 15, the biasing spring 226, which operates between the throttle lever 222 and the crankcase member 218 assist with closing the throttle valves 134 when the shift operator 154 moves the shift cable 156 in the opposite direction. The biasing spring 236, which operates between the throttle cam 232 and the crankcase member 108, causes the throttle cam 232 to follow the movement of the throttle lever 222 to close the throttle valves 134.

Although this invention has been described in terms of certain preferred embodiments, other embodiments apparent to those of ordinary skill in the art are also within the scope of this invention. Accordingly, the scope of the invention is intended to be defined only by the claims that follow.

What is claimed is:

1. An outboard drive comprising an engine which drives a propulsion device through a transmission, said transmission intended to operate under at least two operational conditions, said engine including a crankshaft which rotates within a crankcase about a vertical-extending axis, and a transmission control comprising a shift actuation mechanism including a shift lever attached to a shift control rod which is coupled to a clutch of the transmission, and a shift position mechanism which establishes the position of the shift lever corresponding to the operational condition of the transmission, said shift position mechanism being located directly beneath the crankcase of the engine.

2. An outboard drive as in claim 1, wherein said crankshaft includes a plurality of counterweights which are eccentrically positioned relative to the vertically extending axis, and said crankcase includes a plurality of walls between which are defined a plurality of recesses arranged within said crankcase such that one of said counterweights rotates through said recess as the crankshaft rotates about the vertically extending axis.

3. An outboard drive as in claim 2, wherein said shift position mechanism is located directly beneath a lowermost recess of said crankcase.

4. An outboard drive as in claim 1, wherein said shift position mechanism includes a shift position plate which is integrally formed with said shift lever.

5. An outboard drive as in claim 4, wherein said shift position plate defines a plurality of apertures which are positioned about an arc and spaced apart from each other by a rotational degree that corresponds to the rotational movement of the shift control rod which moves the clutch of the transmission between the operational conditions.

6. An outboard drive as in claim 5, wherein said shift position plate cooperates with a detent mechanism of the shift position mechanism with a detent of the detent mechanism engaging one of the apertures of the shift position plate to establish a position of the shift actuation mechanism corresponding to one of the operational conditions of the transmission.

7. An outboard drive as in claim 6, wherein at least a portion of said detent mechanism is disposed within a lowermost wall of a crankcase member that encloses the crankcase.

8. An outboard drive as in claim 7, wherein said shift actuation mechanism moves said transmission at least between a forward drive condition, a neutral condition, and a reverse drive condition, and said shift position plate includes at least a forward aperture, a neutral aperture and a reverse aperture, each of which is engaged by the detent with the transmission in the corresponding operational condition.

9. An outboard drive as in claim 8, wherein said reverse aperture has an elongated shape.

10. An outboard drive as in claim 1, wherein said shift control rod lies beneath the crankcase.

11. An outboard drive as in claim 10, wherein said shift control rod extends along the vertically extending axis and is positioned below the shift lever.

12. An outboard drive as in claim 1 additionally comprising a shift detection sensor being arranged within the engine to cooperate with the shift lever such that the shift lever actuates the shift detection sensor when the shift lever is moved to a position corresponding to one of the operational conditions of the transmission.

13. An outboard drive as in claim 12, wherein one of said operational conditions of said transmission is a neutral condition, and said shift lever actuates the shift detection sensor when said shift lever is in a position that corresponds to the position of the clutch of the transmission when in the neutral condition.

14. An outboard drive as in claim 1, wherein said transmission control additionally comprises a remote shift operator that operates the shift actuation mechanism through a shift cable.

15. An outboard drive as in claim 14, wherein said shift actuation mechanism includes a coupling device between the shift and the shift lever.

16. An outboard drive as in claim 15, wherein said coupling device comprises a fitting at the end of the shift cable which is pivotably attached to a link by a pivot pin, an end of said link being connected to said shift throttle.

17. An outboard drive as in claim 16, wherein said coupling device additionally comprises a cam member which defines a guide slot in which said pivot pin is disposed, said shift cable arranged to move said pivot pin between a plurality of positions within said guide slot.

18. An outboard drive as in claim 15, wherein at least a portion of said coupling device is positioned in a space provided below an intake silencer and associated induction pipes of the engine induction system.

19. An outboard drive as in claim 18 additionally comprising at least one throttle device which regulates at least a portion of the air flow through the induction system, and a throttle control including a remote throttle operator that operates the throttle actuation mechanism through a throttle cable, said throttle actuation mechanism comprising a linkage system that operates the throttle device and a coupling device that operates between said throttle cable and said linkage system.

20. An outboard drive as in claim 19, wherein at least a portion of said coupling device is positioned in the space provided below the intake silencer and the associated induction pipes of the engine induction system.

21. An outboard drive as in claim 20, wherein said coupling device of said throttle actuation system and said coupling device of said shift actuation system lie side-by-side within the space.

22. An outboard drive as in claim 21, wherein said throttle cable and said shift cable extend in a generally side-by-side from the corresponding remote operators, through a mounting plate on a cowling assembly of the outboard motor, and to the corresponding coupling devices of the shift actuation mechanism and the throttle actuation mechanism.

23. An outboard drive as in claim 22 additionally comprising a fuel conduit which supplies fuel from a remote fuel tank to the engine within the cowling, said fuel conduit being coupled to a quick-disconnect fitting supported by said mounting plate.

24. An outboard drive as in claim 22 additionally comprising at least one electrical cable which supplies electricity from a power source outside the cowling assembly to at least one electrical component of said engine, said cable passing through said mounting plate into said cowling assembly.

25. An outboard drive as in claim 19, wherein said coupling device of said throttle actuation mechanism comprises a throttle lever coupled to said throttle cable, said throttle lever includes a drive follower which engages a cam surface of a throttle cam to which said throttle linkage is coupled.

26. An outboard drive as in claim 25, wherein a bent link interconnects said throttle cam with said throttle linkage.

27. An outboard drive as in claim 26, wherein said engine at least one additional throttle device, and said throttle linkage interconnects said throttle devices so as to operate the throttle devices in unison.

28. An outboard drive as in claim 27, wherein each of said throttle devices forms part of a charge former which produces a fuel air charge delivered to said engine.

* * * * *